United States Patent
Worfolk (10) Patent No.: US 11,972,054 B2
(45) Date of Patent: Apr. 30, 2024

(54) INPUT DEVICE HAVING INTEGRATED HAPTICS AND NEAR FIELD COMMUNICATION ANTENNA

(71) Applicant: Synaptics Incorporated, San Jose, CA (US)

(72) Inventor: Patrick A. Worfolk, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 2 days.

(21) Appl. No.: 17/840,930

(22) Filed: Jun. 15, 2022

(65) Prior Publication Data

US 2023/0076446 A1    Mar. 9, 2023

Related U.S. Application Data

(60) Provisional application No. 63/240,480, filed on Sep. 3, 2021.

(51) Int. Cl.
| G08B 6/00 | (2006.01) |
| G06F 3/01 | (2006.01) |
| G06F 3/0354 | (2013.01) |
| G09B 21/00 | (2006.01) |
| H01Q 1/22 | (2006.01) |
| H04B 3/36 | (2006.01) |
| H04B 5/00 | (2006.01) |

(52) U.S. Cl.
CPC .......... *G06F 3/016* (2013.01); *G06F 3/03547* (2013.01); *H01Q 1/22* (2013.01); *H04B 5/0025* (2013.01)

(58) Field of Classification Search
CPC ....... G06F 3/016; G06F 3/03547; H01Q 1/22; H04B 5/0025
See application file for complete search history.

(56) References Cited

U.S. PATENT DOCUMENTS

| 9,148,190 | B1 * | 9/2015 | Buuck | H04B 1/38 |
| 10,263,451 | B2 * | 4/2019 | Konanur | H02J 50/10 |
| 11,134,141 | B1 * | 9/2021 | Bushnell | H01Q 1/42 |
| 11,156,965 | B1 * | 10/2021 | Trapero Martin | A61B 5/7435 |

* cited by examiner

*Primary Examiner* — Toan N Pham
(74) *Attorney, Agent, or Firm* — Leydig, Voit & Mayer, Ltd.

(57) ABSTRACT

An input device is provided. The input device comprises a printed circuit board (PCB) assembly comprising: touch sensors configured to detect a user input from a user; a haptic coil configured to provide haptic feedback to the user in response to detecting the user input; and a near-field communication (NFC) antenna configured to facilitate NFC communications, wherein the haptic coil and the NFC antenna are on a same PCB of the PCB assembly.

16 Claims, 7 Drawing Sheets

INPUT DEVICE HAVING INTEGRATED HAPTICS AND NEAR FIELD COMMUNICATION ANTENNA

CROSS-REFERENCE TO RELATED APPLICATIONS

This patent application claims the benefit of U.S. Provisional Patent Application No. 63/240,480, filed Sep. 3, 2021, which is incorporated by reference herein in its entirety.

TECHNICAL FIELD

This disclosure relates generally to sensing touchpads, and more specifically to sensing touchpads integrated with near-field communication (NFC) devices (e.g., NFC antennas) and haptic devices (e.g., haptic coils).

BACKGROUND

Input devices such as touch sensor devices (also commonly called touchpads, forcepads, touch sensor devices, or other such devices), are widely used in a variety of electronic systems. Input devices typically include a sensing region, often demarked by a surface, in which the input device determines the presence, location, and/or motion of one or more input objects. Input devices may provide an input interface for an electronic system. For example, input devices may be used for larger electronic systems (such as opaque touchpads integrated in, or peripheral to, notebook or desktop computers). Input devices may also be used in smaller electronics systems (such as touch screens integrated in cellular phones).

Haptic devices (e.g., a haptic coil) may be configured to provide haptic feedback (e.g., audible and vibratory feedback) to a user. For instance, input devices may detect inputs by a user and supply haptic feedback such as audible feedback (e.g., sounds simulating a mouse click) and vibratory feedback (e.g., a slight vibration) indicating that an input was detected to the user. Further, an active (e.g., powered) near field communication (NFC) device (e.g., a transceiver) may use radio frequency (RF) communication signals for short range communication between compatible NFC devices. Currently, haptic devices and NFC devices are independent of each other and there remains challenges to having an input device that includes both a haptic device and an NFC device.

SUMMARY

In some instances, an input device is provided. The input device includes a printed circuit board (PCB) assembly. The PCB assembly includes touch sensors, a haptic coil, and a near-field communication (NFC) antenna. The touch sensors are configured to detect a user input from a user. The haptic coil is configured to provide haptic feedback to the user in response to detecting the user input. The NFC antenna is configured to facilitate NFC communications. Further, the haptic coil and the NFC antenna are on a same PCB of the PCB assembly.

In some examples, a method is provided. The method comprises detecting, using touch sensors of an input device, user input from a user. The input device comprises a printed circuit board (PCB) assembly, and the PCB assembly comprises the touch sensors, a haptic coil, and a near-field communication (NFC) antenna. The method further comprises providing, using the haptic coil of the input device, haptic feedback to the user in response to detecting the user input, and facilitating NFC communications using the NFC antenna of the input device, wherein the haptic coil and the NFC antenna are on a same PCB of the PCB assembly.

In some examples, a PCB assembly is provided. The PCB assembly comprises: touch sensors, a haptic coil, and a near-field communication (NFC) antenna. The touch sensors are configured to detect a user input from a user. The haptic coil is configured to provide haptic feedback to the user in response to detecting the user input. The NFC antenna is configured to facilitate NFC communications. Further, the haptic coil and the NFC antenna are on a same PCB of the PCB assembly.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Various examples of the present disclosure provide input devices and methods that integrate a haptic device (e.g., a haptic coil) and a near-field communication (NFC) device (e.g., an NFC transmitter/antenna) within the input device such that the input device provides haptic feedback to a user as well as provides radio frequency (RF) communication functionality. The NFC antenna and/or the haptic coil may contribute to interference within the input device and may negatively affect operations of the input device. For instance, the interference may include interference between the NFC antenna and the touch sensors, interference between the haptic coil and the NFC antenna, and/or interference between the haptic coil and the touch sensors. As such, the input device may coordinate in providing the haptic feedback and communicating the NFC signals so as to avoid the electrical interference between the haptic and NFC devices.

Accordingly, the implementation of both a haptic device and an NFC device in close proximity may be difficult due to the physical space occupied by the respective devices interfering with one another and further due to electrical interference (e.g., from a haptic actuator/coil on the NFC communications).

Examples of the present disclosure provide an input device that integrates a haptic device (e.g., haptic coil) and an NFC device (e.g., NFC antenna) such that it provides a simplified design, manufacturing, and coexistence. In particular, portable device (e.g., laptop) original equipment manufacturers (OEMs) are using forcepad technology (e.g., a touchpad that includes finger pressure or force sensitivity) that uses a haptic actuator in order to generate an appropriate click to emulate the mechanical click of a regular touchpad. For instance, the forcepad may measure the force applied anywhere on the surface and when the force applied exceeds a threshold, a haptics actuator may provide haptic feedback as if there was a mechanical click. In other words, traditional touchpads may include a mechanical mechanism that provides a clicking noise and feeling as they are actuated and/or depressed. However, in some input devices (e.g., certain touchpads such as touchpads with the forcepad technology), when actuated or depressed, the input devices do not physically generate a clicking noise or feeling. Instead, a haptic device (e.g., a haptic actuator) is used to simulate the traditional clicking noise and feel, thereby providing haptic feedback that simulates the clicking noise and feel (e.g., vibration) of the traditional touchpads.

Further, certain input devices have NFC functionality integrated with the input devices, especially if the portable device shell is metal and thus prevents wireless communications through the deck. In some instances, the present disclosure provides for the integration of an electromagnetic coil for haptic and an antenna for NFC communications into one or more printed circuit boards (PCBs) of an input device. The haptic and NFC devices may be mounted to the bottom of a PCB that also includes sensor electrodes (e.g., proximity sensors and/or force sensors). The haptic device may include one or more electromagnetic coils integrated into the input device and/or a magnet integrated into the bracket or laptop chassis. For instance, larger input devices (e.g., larger touchpads) may include multiple haptic coils. The one or more coils of the haptic device may be in the central region of the PCB, and may be surrounded by an NFC antenna coil in the perimeter region of the PCB. The haptic trigger may be coordinated with the NFC communications such that the NFC communications are not impaired. This will be described in further detail below.

Among other advantages, an input device that integrates both a haptic device and an NFC device may include benefits and advantages such as better performance, lower cost, and lower development expenses. Additionally, and/or alternatively, the input device may also be thinner and/or supply chains may be simplified. Furthermore, in some instances, the NFC device may interfere with the touch control (e.g., the electrodes that sense the user input), and this interference (e.g., the lack of coordination between the NFC device and the touch sensors) may cause missed touches or false touches. Further, the haptic coil may also interfere with the NFC communication and/or the touch control as the haptic coil(s) may cause problems with both NFC and input. Therefore, the input device of the present disclosure reduces interference between the NFC device, the haptic device, and/or the touch control to provide for better functionality/performance for the input device.

Figure 1:
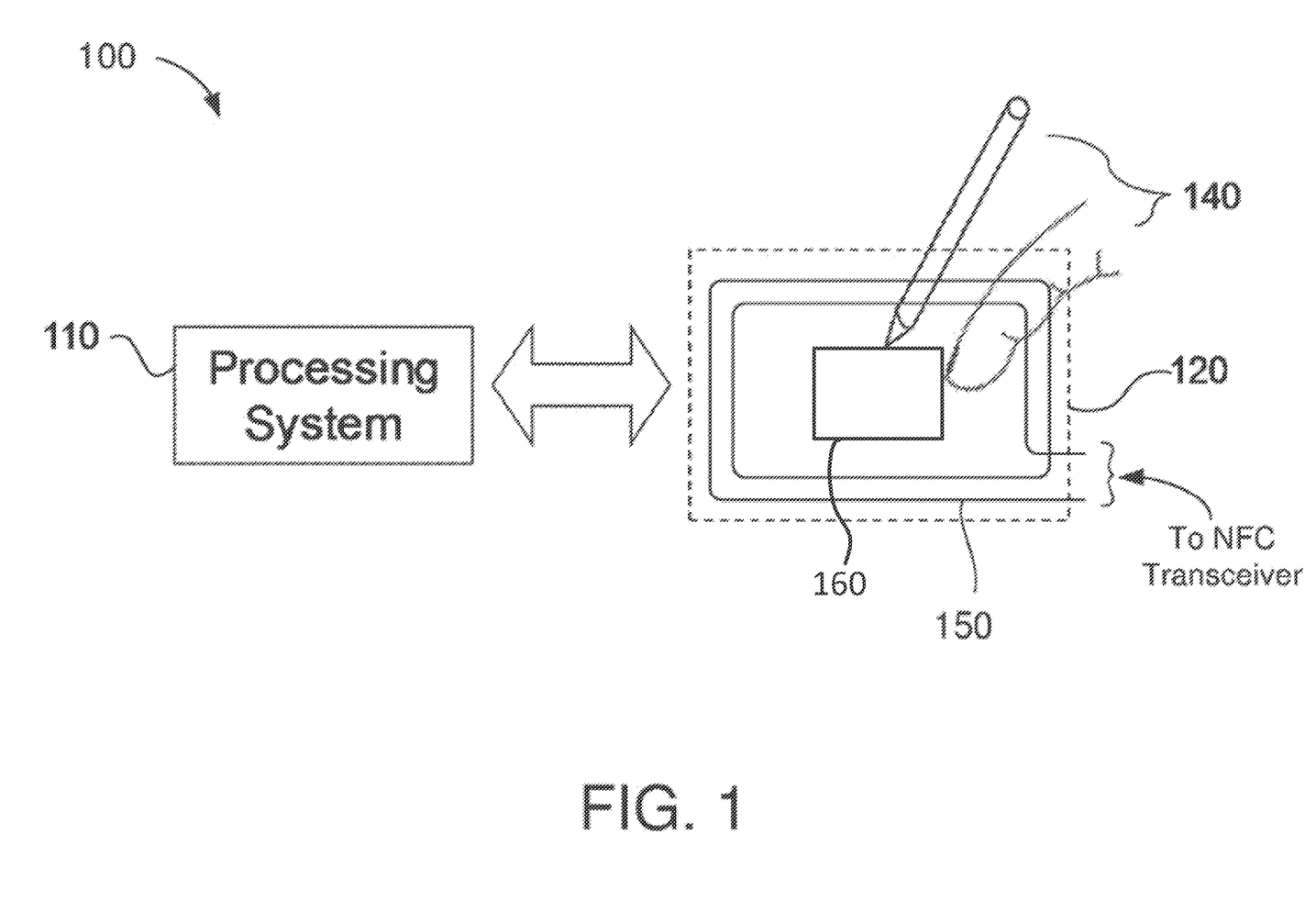
FIG. 1 is a block diagram depicting an input device according to one or more examples of the present disclosure.

FIG. 1 is a block diagram depicting an input device according to one or more examples of the present disclosure. The input device 100 may include a processing system 110, a sensing region 120, an NFC device 150 (e.g., an NFC antenna), and a haptic device 160 (e.g., a haptic coil). Although the NFC device 150 is shown as a loop antenna that includes two turns of a conductor within the sensing region 120, in other variations, the antenna may include any number of turns and may extend beyond the sensing region 120 (e.g., see FIG. 2B, which includes a different number of turns). The NFC device 150 may be formed by a wire or other suitable metallic or semi-metallic conductor, by conductive traces disposed upon a printed circuit board or other suitable substrate or formed in any other feasible manner. In some instances, the NFC device 150 may be an NFC antenna such as a patch antenna, a dipole antenna, a monopole antenna, or any other technically feasible antenna design. The NFC device 150 may be coupled to a transceiver, such as a near field communications (NFC) transceiver, to receive and transmit NFC radio-frequency (RF) communication signals. NFC communication signals may be described by ISO/IEC 14443, ISO/IEC 18092, ISO/IEC 21481 or any other technically feasible NFC standard. In other instances, any other technically feasible transceiver may be coupled to the NFC device 150, including, for example, a Bluetooth® transceiver or a transceiver operating according to an IEEE 802.11 specification.

The haptic device 160 (e.g., a haptic coil) may be any device that provides haptic feedback to a user. For example, the haptic device 160 may provide audible and vibratory feedback (hereinafter "haptic feedback") to a user in response to a touch input in order to mimic the auditory and tactile response of a mechanical device (e.g., a mechanical snap button or switch) when depressed and released. For instance, the haptic device 160 may provide a vibration and output an audio sound in order to replicate a tactile feel and audible sound of a mechanical button being depressed. The haptic device 160 may be include and/or be implemented by one or more actuators such as linear resonant actuators (LRAs), piezo actuators, coils and/or solenoids. In some instances, the haptic device 160 may include a coil (e.g., a magnetic coil such as a magnetic voice coil) and/or a magnet. For instance, the haptic device 160 may include an electromagnet (e.g., a coil) integrated (e.g., positioned and/or located) into a first portion (e.g., touchpad) of the input device 100 as well as a magnet that is integrated into a second portion (e.g., bracket or chassis) of the input device 100 and/or an electronic system.

The input device 100 may be configured to provide input to an electronic system. As used herein, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include data output devices (e.g., display screens and printers), remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 may be implemented as a physical part of the electronic system, or can be physically separate from the electronic system. Alternatively, the input device 100 may be physically separated from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth, radio frequency (RF), and Infrared Data Association (IRDA).

In some examples, the input device 100 may correspond to a proximity sensor device (e.g., also referred to as a "touchpad" or "touch sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

Additionally, and/or alternatively, the input device 100 may correspond to a forcepad that includes functionality to perform proximity and/or force detection. Force detection is the ability to detect an amount of force applied to an input surface. Proximity detection is the ability to sense input provided by one or more input objects 140 in a sensing region 120.

In some variations, the sensing region 120 extends from a surface of the input device 100 in one or more directions into space, for example, until a signal-to-noise ratio falls below a threshold suitable for object detection. For example, the distance to which this sensing region 120 extends in a particular direction, in various examples, may be on the order of less than a millimeter, millimeters, centimeters, or more, and may vary with the type of sensing technology used and/or the accuracy desired. In some instances, the input device 100 detects inputs involving no physical contact with any surfaces of the input device 100, contact with an input surface (e.g. a touch surface) of the input device 100, contact with an input surface of the input device 100 coupled with some amount of applied force or pressure, and/or a combination thereof.

In various examples, input surfaces may be provided by surfaces of a housing of the input device 100 within which the sensor electrodes reside, by face sheets applied over the sensor electrodes or any casings, etc. In some variations, the sensing region 120 has a rectangular shape when projected onto an input surface of the input device 100.

In some instances, the input device 100 may use various sensing technologies to detect user input. Example sensing technologies may include capacitive, elastive, resistive, inductive, magnetic, acoustic, ultrasonic, and optical sensing technologies. In some examples, the input device 100 may use capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes.

For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may use resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some variations, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground reference voltage.

In some instances, the input device 100 may use transcapacitance (also referred to as "transcapacitance") sensing technologies. Transcapacitance sensing methods detect changes in the capacitive coupling between sensor electrodes. For example, an input object or ground near the sensor electrodes may alter the electric field between the sensor electrodes, thus changing the measured capacitive coupling of the sensor electrodes. In some instances, the input device 100 may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Signals on the transmitter sensor electrodes may be modulated relative to a reference voltage (e.g., system ground) to transmit transmitter signals while receiver sensor electrodes may be held at a substantially constant voltage relative to the reference voltage to receive resulting signals. The reference voltage may be a substantially constant voltage or may be system ground. The resulting signal may be affected by environmental interference (e.g., other electromagnetic signals) as well as input objects or ground in contact with, or in close proximity to, the sensor electrodes.

The processing system 110 may be configured to operate the hardware of the input device 100 to detect input in the sensing region 120. In some instances, the processing system 110 may control one or more sensor electrodes to detect objects in the sensing region 120. For example, the processing system 110 may include parts of or all of one or more integrated circuits (ICs) and/or other circuitry components that are configured to transmit signals via one or more transmitter sensor electrodes and receive signals via one or more receiver sensor electrodes. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 110 may be implemented as software executed by a central processing unit (CPU) of the computing device. In another example, the input device 100 may be physically integrated in a mobile device, and the processing system 110 may correspond, at least in part, to a CPU of the mobile device.

In some examples, the processing system 110 may be implemented as a set of modules that are implemented in firmware, software, or a combination thereof. Example modules include hardware operation modules for operating hardware such as sensor electrodes and display screens, data processing modules for processing data such as sensor signals and positional information, and reporting modules for reporting information. In some variations, the processing system 110 may include sensor operation modules configured to operate sensing elements to detect user input in the sensing region 120, identification modules configured to identify gestures such as mode changing gestures, and mode changing modules for changing operation modes of the input device 100 and/or electronic system.

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

While FIG. 1 shows an exemplary configuration of components, other configurations may be used without departing from the scope of the disclosure. For example, various components may be combined to create a single component. As another example, the functionality performed by a single component may be performed by two or more components.

Figure 2A:
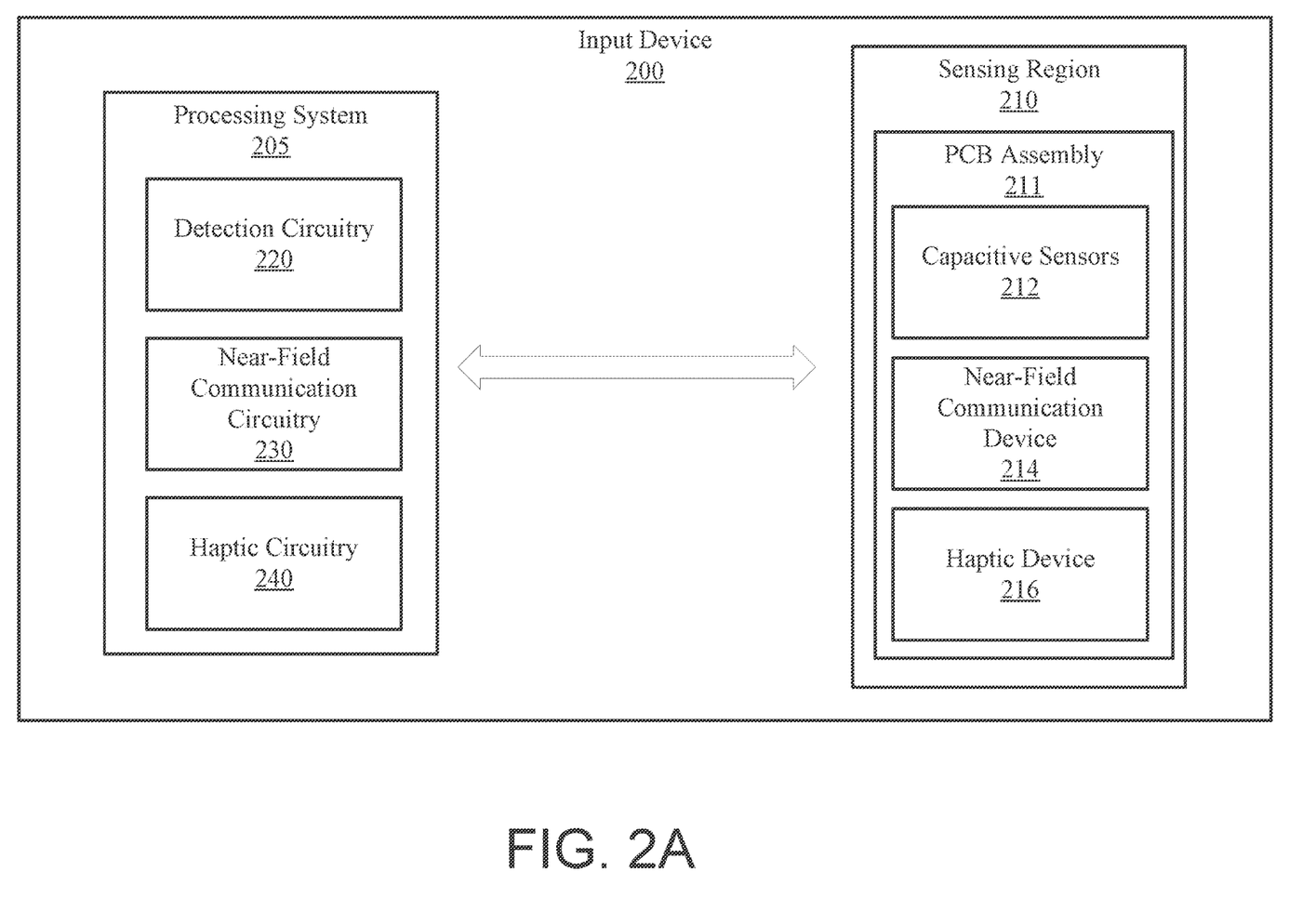
FIG. 2A is another block diagram depicting an input device according to one or more examples of the present disclosure.
Figure 2B:
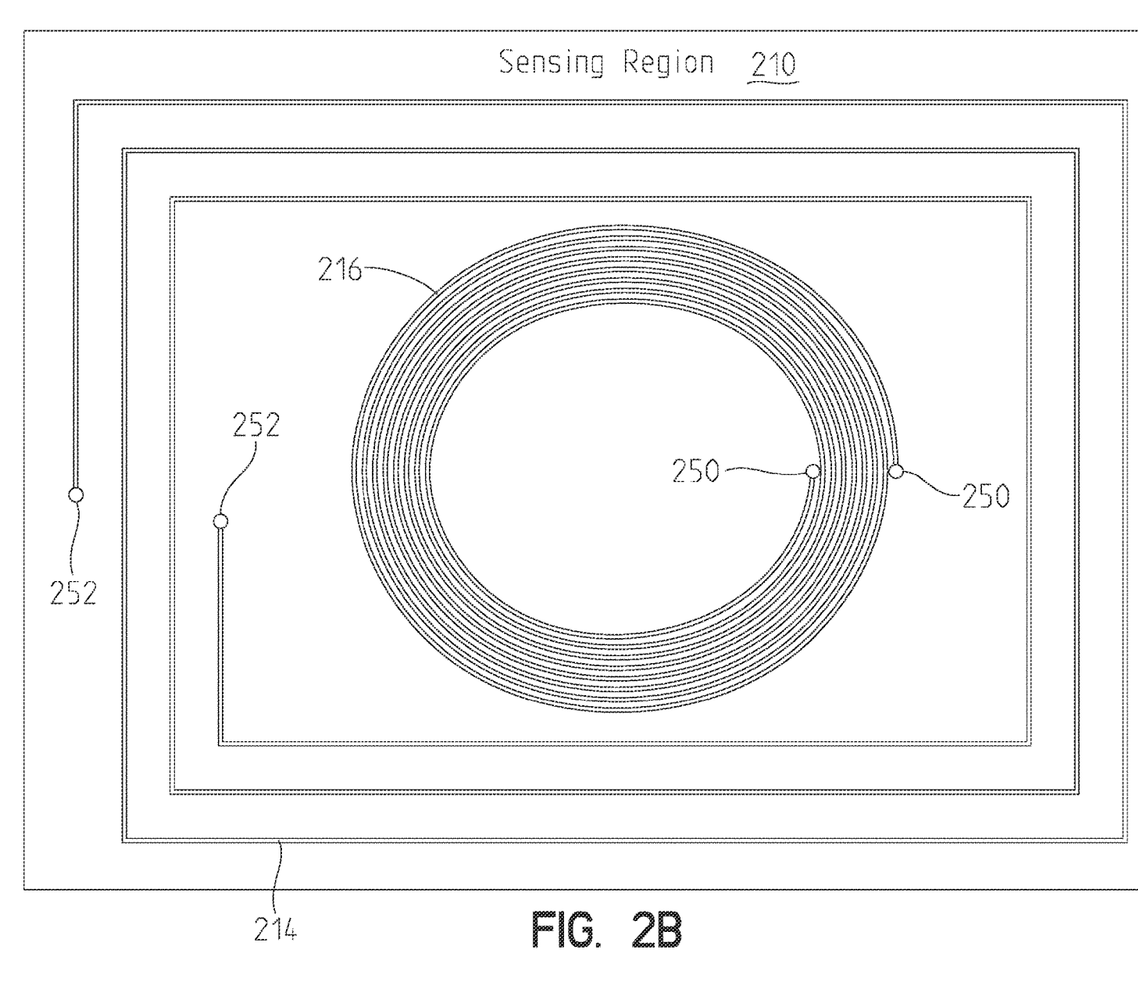
FIG. 2B shows a portion of an input device according to one or more examples of the present disclosure.

FIG. 2A is another block diagram depicting an input device according to one or more examples of the present disclosure and FIG. 2B shows a portion of the input device from FIG. 2A according to one or more examples of the present disclosure. Referring to FIG. 2A, the input device 200 may be an example of the input device 100 of FIG. 1. The input device 200 may include a sensing region 210 and a processing system 205. The sensing region 210, which may be an example of the sensing region 120 of FIG. 1, may encompass any space above, around, in, and/or proximate to the input device 200 in which the input device 200 is able to detect user input, such as provided by one or more input objects (not shown for simplicity). The size, shape, and/or location of the sensing region 210 may vary depending on actual implementations.

The sensing region 210 may include a printed circuit board (PCB) assembly 211 that includes capacitive sensors 212, a near-field communication (NFC) device 214, and a haptic device 216. The PCB assembly 211 may include one or more PCBs. For instance, the PCB assembly 211 may include a single PCB. The PCB may include multiple (e.g., six) layers and the layers may include capacitive sensors 212 that are configured to detect a user input from an input object (e.g., input objects 140), an NFC device 214 (e.g., an NFC antenna), and a haptic device 216 (e.g., a haptic coil). For instance, the first four layers of the PCB may be for the capacitive sensors 212 and the last two layers may be for the haptic device 216 as well as the NFC device 214. In other instances, the PCB assembly 211 may include multiple PCBs. For instance, the first PCB may be used for the capacitive sensors 212. Another PCB may be used for the NFC device 214 and/or the haptic device 216. For instance, a second PCB may include the NFC antenna 214 and the haptic coils 216. The PCB assembly 211 will be described in further detail below in FIGS. 3A and 3B.

The capacitive sensors 212 may include an array of sensor electrodes that create an electric field in and/or around the sensing region 210. The input device 200 may sense user inputs by detecting changes in capacitance and/or electric field through the capacitive sensors 212. In some variations, the capacitive sensors 212 may include transmitter sensor electrodes and receiver sensor electrodes (not shown for simplicity). In some instances, the input device 200 may include other types of sensors that are used to detect user input. For instance, the input device 200 may include touch sensors (e.g., capacitive sensors 212 and/or other types of sensors such as optical sensors) that are used to detect the user input.

The capacitive sensors 212, the NFC device 214, and the haptic device 216 may be coupled to the processing system 205. The processing system 205 may include a detection circuitry 220, NFC communication circuitry 230, and haptic circuitry 240. The capacitive sensors 212 may be coupled to the detection circuitry 220. The detection circuitry 220 controls operation of the capacitive sensors 212. For example, the detection circuitry 220 may operate the capacitive sensors 212 to determine a pressure and/or position associated with an input object (e.g., input object 140). In some instances, the processing system 205 may include a touch controller (e.g., a controller configured to detect user input). For instance, the detection circuitry 220 may include the touch controller. In other instances, the touch controller may be separate from the processing system 205. For example, the detection circuitry 220 may be used to couple or connect the touch controller with the capacitive sensors 212.

The functionality of the NFC device 214 and the haptic device 216 may be similar to the haptic device 160 and the NFC device 150 described in FIG. 1. The NFC device 214 (e.g., an NFC antenna) may be coupled to the NFC communication circuitry 230. The NFC communication circuitry 230 may be implemented by any circuitry and/or processor or controller associated with an electronic system including the input device 200. In some instances, the NFC communication circuitry 230 may be separate from the input device 200 and may be coupled to the NFC device 214 by stripline, microstrip, coax, or in other technically feasible manners. The NFC communication circuitry 230 may control NFC communications via an NFC transceiver that may be coupled to the NFC device 214. The NFC communication circuitry 230 may cause the NFC transceiver to transmit and/or receive RF signals through the NFC device 214. In some examples, the functionality of the NFC transceiver may be included with the NFC communication circuitry 230. In other examples, the NFC communication circuitry 230 may be separate from the NFC transceiver.

The haptic device 216 (e.g., a haptic coil) may be coupled to the haptic circuitry 240. The haptic circuitry 240 may be implemented by any circuitry and/or processor or controller associated with an electronic system including the input device 200. In some instances, the haptic circuitry 240 may be separate from the input device 200 and may be coupled to the haptic device 216. The haptic circuitry 240 may control the haptic device 216 in order to provide haptic feedback to a user. For instance, the haptic circuitry 240 may cause the haptic device 216 to provide haptic feedback in response to the detection circuitry 220 detecting a user input.

In some instances, the input device 200 may include a second NFC device and/or a second haptic device. For example, the NFC device 214 may be an NFC antenna including a plurality of loops. The second NFC device may be an NFC transceiver. Additionally, and/or alternatively, the haptic device 216 may be a haptic coil that includes a plurality of loops. The second haptic device may be a magnet that is positioned in a chassis or bracket of the input device 200 and/or the electronic system that is coupled to the input device.

Referring to FIG. 2B, a sensing region 210 is shown (e.g., the sensing region 210 of FIG. 2A). In particular, the sensing region 210 includes the haptic device 216 as a haptic coil. The nodes 250 may couple the haptics coil to the haptic circuitry 240. The sensing region 210 further includes the NFC device 214 as an NFC antenna with multiple loops. The nodes 252 may couple the NFC antenna to the NFC communication circuitry 230.

In operation, in some examples, the NFC antenna 214 may be constrained to the area of the input device 200 (e.g., a touchpad) and may be in areas of the input device 200 that facilitate the signal passing from the antenna 214 behind the capacitive sensors 212 to the NFC communication circuitry 230 (e.g., the NFC transmitter) over the input device 200. The antenna 214 may include several loops, and performance of the antenna 214 may be improved by making the coils larger (e.g., including additional loops). As such, as will be described in FIGS. 3A and 3B, examples of the present disclosure may include one or more PCBs. Additional PCBs may be used such that they provide more space for additional loops of the antenna 214 and/or the haptics coil 216.

In some variations, an electromagnetic coil (e.g., the haptic coil 216) may create higher magnetic fields by having more loops, and the size of the magnet embedded below the touchpad may be based on the number of loops. To give appropriate strength, using more layers in a substrate such as a PCB may allow for more loops. In other words, referring to FIG. 2A, the input device 200 may include a touchpad such as a PCB assembly 211 with the capacitive sensors 212. The NFC antenna 214 and haptic coil 216 may be disposed below the touchpad, and a magnet may be disposed below the NFC antenna 214 and haptic coil 216. The magnet and the haptic coil 216 may be used together to provide haptic feedback for a user. Further, the magnet may be sized based on the number of loops within the haptic coil 216.

These two structures (e.g., the NFC antenna 214 and the haptic coil 216) may be embedded on the same substrate and attached, mechanically and electrically, to the back of the touchpad PCB. One substrate choice is a 6-layer flame retardant 4 (FR4) PCB. In other words, the PCB may include six layers with the first few layers (e.g., first four layers) being the touchpad (e.g., the capacitive sensors 212). Below these first few layers (e.g., the next 2 layers and/or a separate PCB) may be the NFC antenna 214 and the haptic coil 216. This allows sufficient loops for a strong enough electromagnet for haptic feedback.

In some instances, based on the NFC antenna 214 being patterned close to the perimeter of the PCB, then this may reduce the area or overall size of the PCB as compared to the touchpad PCB. For instance, when the NFC antenna 214 and the haptic coil 216 are implemented on a separate PCB, the separate PCB may be smaller in size than the touchpad PCB having the capacitive sensors 212.

Additionally, and/or alternatively, the NFC antenna 214 and the haptic coil 216 may be patterned on the touchpad PCB having the capacitive sensors 212. However, this may reduce the strength of the electromagnet coil/haptic coil, as there may only be a few layers available on the PCB for implementation of the electromagnet coil.

In some instances, to prevent interference between the haptic device 216 and the NFC device 214, the processing system 205 may disable the haptic device 216 (e.g., may cease driving the haptic device 216) during NFC communication, in order to avoid interference. In other words, to prevent and/or reduce the interference caused by having an input device 200 with the haptic device 216 and the NFC device 214, the processing system 208 may use a time-division process that enables/disables the haptic device 216 and the NFC device 214 such that they are not operating at the same time. For instance, the processing system 205 may first enable the haptic device 216 such that it provides haptic feedback to a user. Then, during NFC communication, the processing system 205 may disable the haptic device 216 and enable the NFC device 214. After the NFC communication, the processing system 205 may enable the haptic device 216 and disable the NFC device 214. Additionally, and/or alternatively, the enabling and disabling may be based on a timer (e.g., the haptic device 216 is enabled for a few seconds and disabled for a few seconds, and same for the NFC device 214).

Additionally, and/or alternatively, the processing system 205 may modify the haptic driving signals so as not to interfere with the NFC signals or to interfere as minimally as possible while also minimizing any negative impact on the haptics experience. For instance, the processing system 205 may modify the haptic signal by reducing or removing certain frequencies from the haptic signal that may interfere with the NFC signals. The modified haptic signal may be slightly weaker than a regular haptic signal, but still able to produce a haptic feedback for the user. Additionally, and/or alternatively, the processing system 205 may generate, modify, select and/or process the haptics driving signals such that these signals do not interfere with the touch sensor (e.g., the capacitive sensors 212).

In some variations, the touch controller may select (e.g., determine) a sensing frequency to specifically avoid interference coming from the haptics driving and interference coming from the NFC communications, in addition to avoiding other interference from the device (e.g., input device 200) and/or environment. In some examples, the frequencies and signals for all three functions may be jointly selected (e.g., the touch controller may jointly select the frequencies for the three functions). Further, the touch controller may modify its analog and digital filtering when operating in the presence of haptics actuations or NFC communications. In some instances, this filtering may be undesirable in regular operation, but when interference is present (e.g., based on the haptics actuations and/or the NFC communications). For example, additional digital signal processing may result in a slower touch report rate. However, this might be in adverse conditions when compared to missing touches or reporting erroneous touch points. In some variations, the touch sensing may be disabled temporarily while the haptic and/or the NFC functions are active.

Figure 3A:
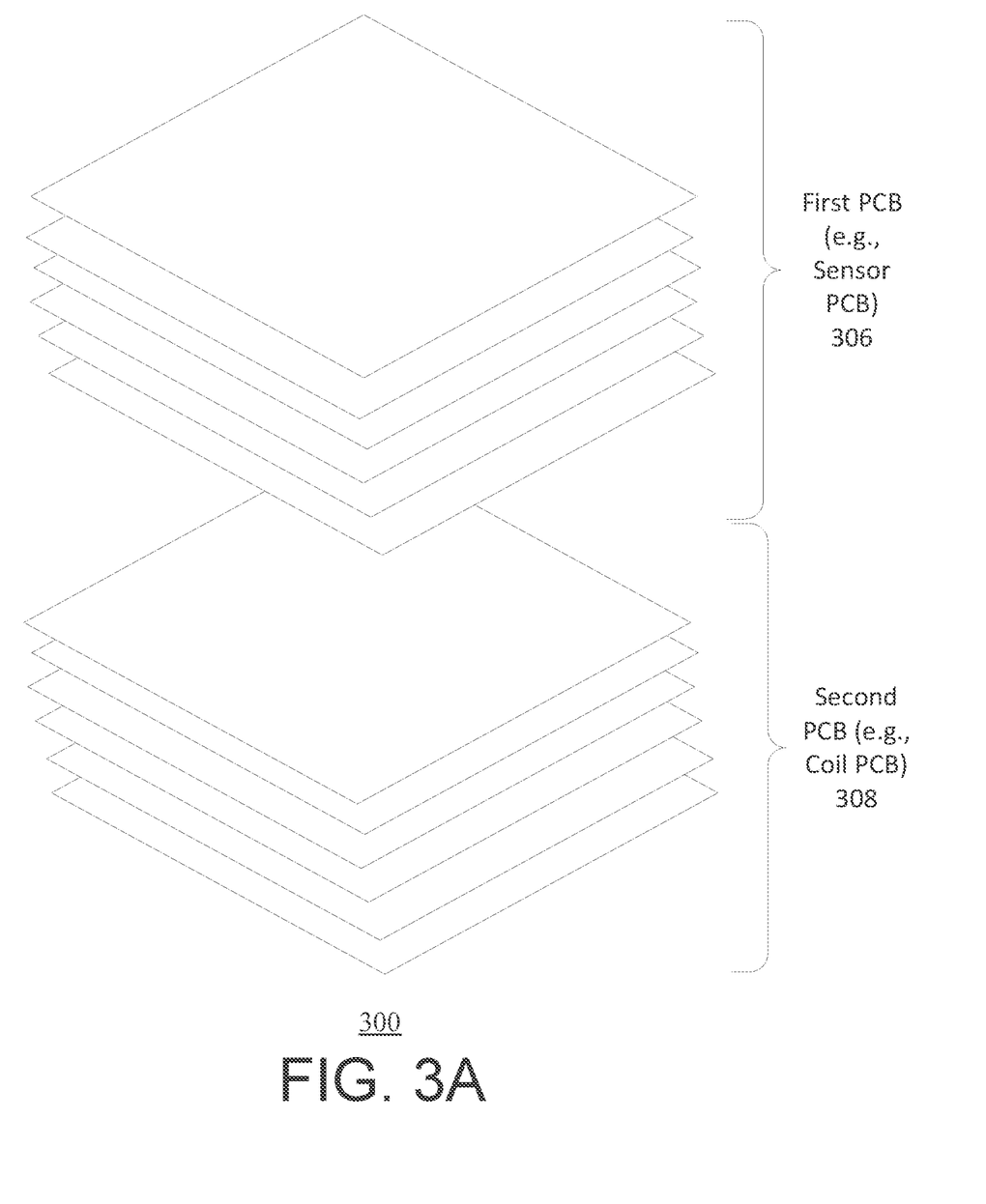
FIGS. 3A and 3B are example side perspective diagrams of components within an input device according to one or more examples of the present disclosure.
Figure 3B:
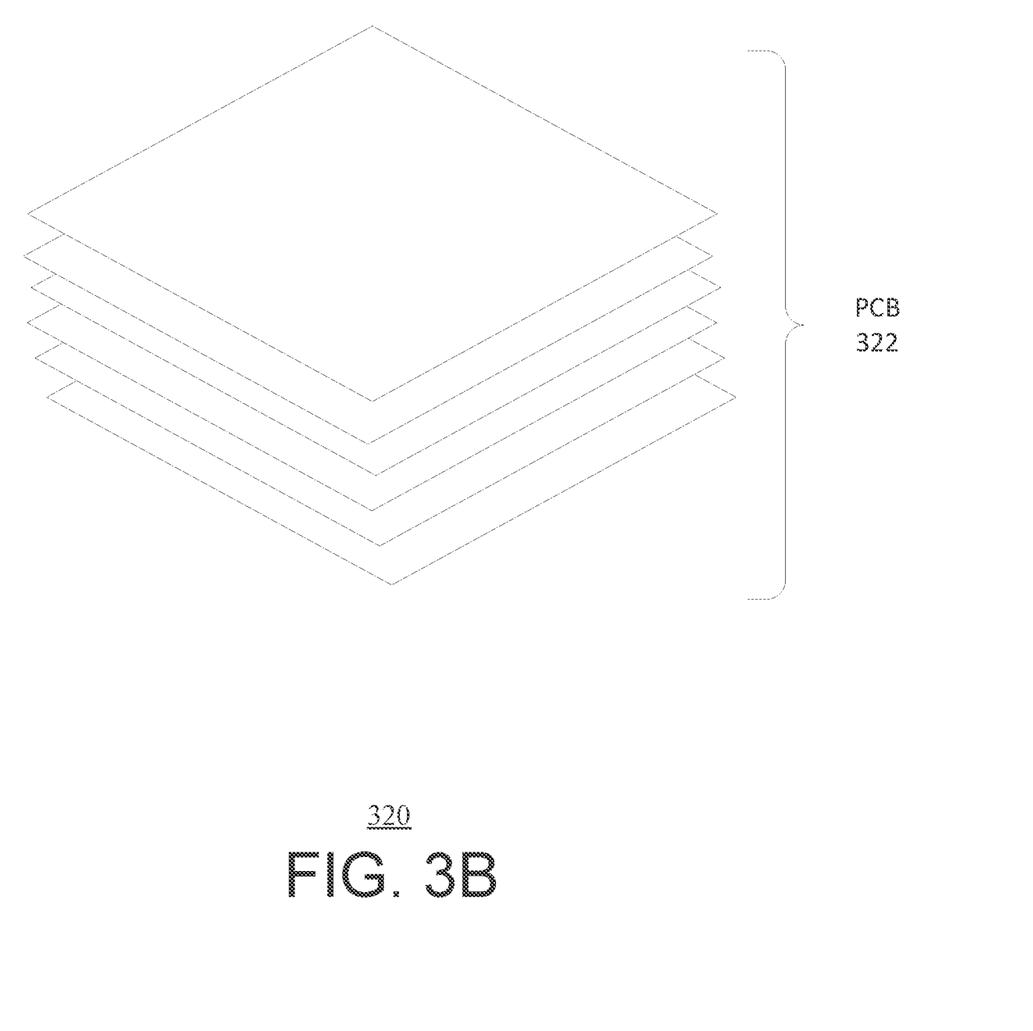

FIGS. 3A and 3B are example side perspective diagrams of components within an input device according to one or more examples of the present disclosure. In particular, FIG.

3A shows a PCB assembly 300 with two separate PCBs and FIG. 3B shows a PCB assembly 320 with a single PCB. The PCB assemblies 300 and 320 may be non-limiting examples of the PCB assembly 211 of FIG. 2A.

Referring to FIG. 3A, the PCB assembly 300 includes two separate PCBS, each with multiple layers. The layers may be laminated and/or printed layers of material. The various layers are parallel with respect to each other in one or more examples. For illustrative purposes, the layers are shown with spacing between the layers. However, the layers are stacked in one or more examples. Further, the thickness of each layer may vary between layers without departing from the scope of the disclosure. Additionally, the dimensions and shape of the input device 200 may vary from shown in the FIGS. 3A and 3B without departing from the scope of the disclosure. Any dimension and shape of layers within the input device 200 is contemplated herein. The multiple layers may be separated into two PCBs. The first PCB 306 may be a sensor PCB that includes the capacitive sensors 212. For instance, the first PCB 306 may include one or more sensor layers that include sensor electrodes configured to detect a presence of an input object in the sensing region and/or a force sensor layer that is configured to detect force applied to the input surface. The first PCB 306 may further include additional layers as well such as an input surface, which may be a touch surface of the input device 200 that may be touched by an input object during operation of the input device 200 to provide input. The layers may further include a grounding layer and/or a trace layer. The second PCB 308 may be a coil PCB that includes the haptic device 216 and the NFC device 214. For instance, the haptic device 216 may be a haptic coil and the NFC device 214 may be an NFC antenna.

Referring to FIG. 3B, the PCB assembly 320 includes a single PCB with multiple layers. For instance, unlike FIG. 3A, the PCB assembly 320 may include a PCB 322 (e.g., a single PCB). The PCB 322 may include the capacitive sensors 212, the haptic device 216, and the NFC device 214. For example, the first few layers of the PCB 322 may include capacitive sensing circuitry for the sensing of an input by an input object (e.g., may include an input surface, one or more sensor layers, and/or other layers). Then, below these first few layers, the PCB 322 may include the haptic device 216 (e.g., the haptic coil) and the NFC device 214 such as shown in FIG. 2B.

FIGS. 3A and 3B are merely examples of the PCB assembly 211 of FIG. 2A. In other examples, the PCB assembly 211 may include additional PCBs and/or may be implemented differently.

Figure 4:
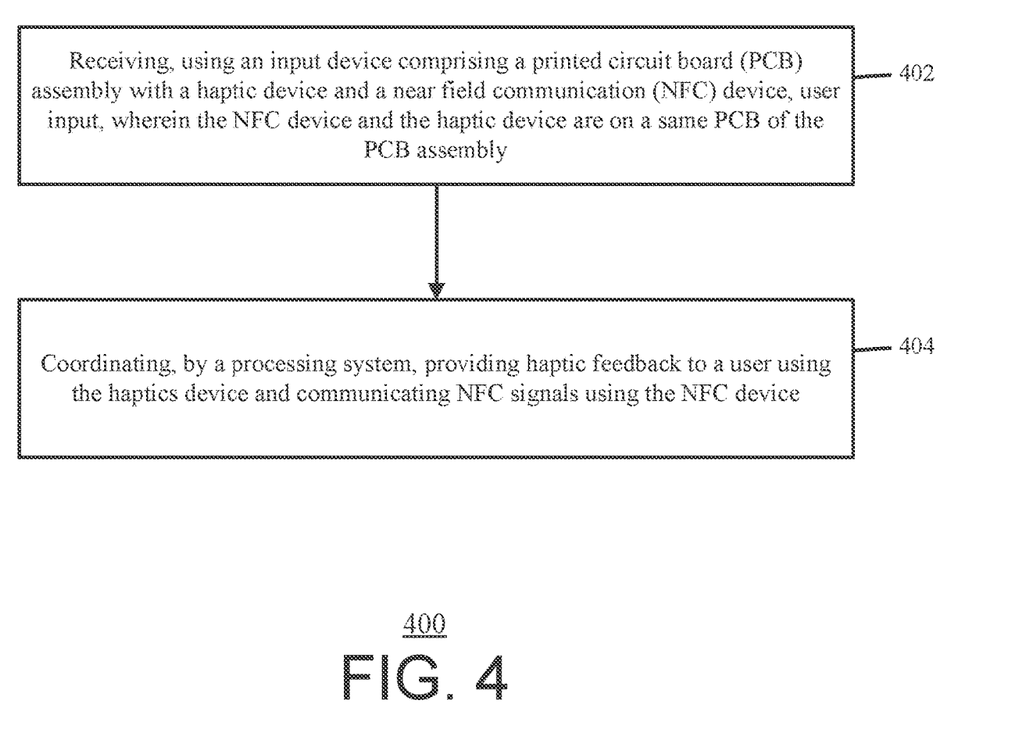
FIG. 4 is a flowchart of an exemplary process for using an input device including a haptic device and an NFC device according to one or more examples of the present disclosure.
Figure 5A:
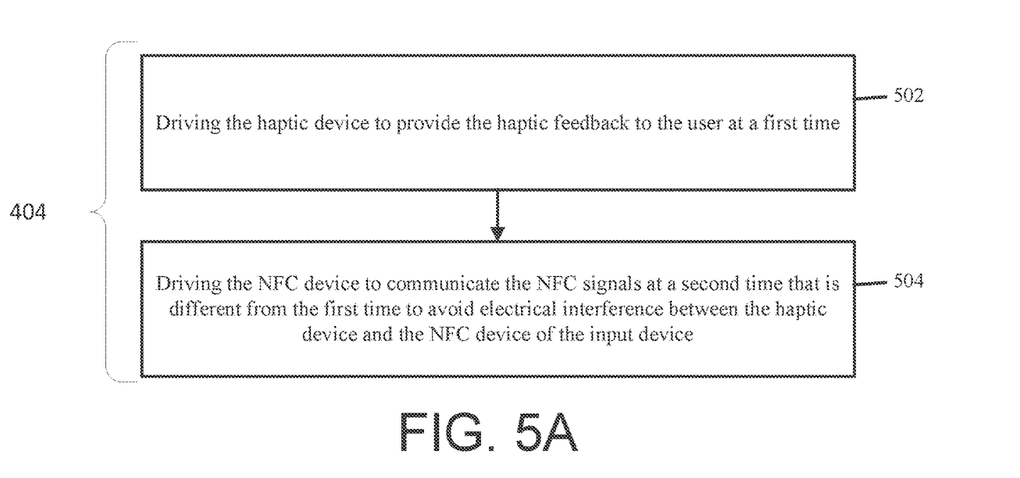
FIGS. 5A-5B are flowcharts of exemplary processes for using an input device including a haptic device and an NFC device according to one or more examples of the present disclosure.
Figure 5B:
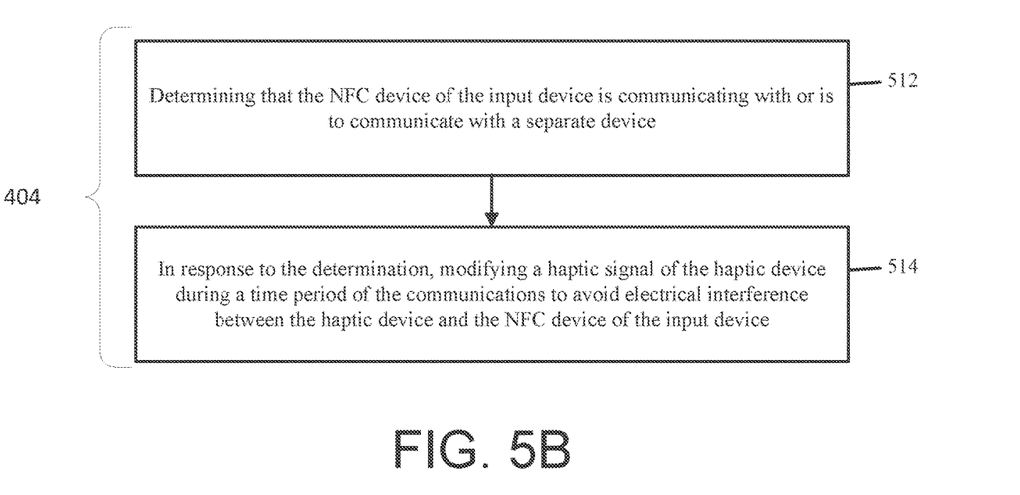

FIG. 4 is a flowchart of an exemplary process 400 for using an input device including a haptic device and an NFC device according to one or more examples of the present disclosure. FIGS. 5A-5B are flowcharts of exemplary processes for using an input device including a haptic device and an NFC device according to one or more examples of the present disclosure. In particular, FIGS. 5A and 5B further expand upon the block 404 of FIG. 4. As such, FIGS. 5A and 5B will be described together with FIG. 4. The process 400 may be performed by the input device 100 or 200 and in particular, the processing system 110 or 205 shown in FIGS. 1 and 2A. However, it will be recognized that an input device that includes additional and/or fewer components as shown in FIGS. 1 and 2A may be used to perform process 400, that any of the following blocks may be performed in any suitable order, and that the process 400 may be performed in any suitable environment. The descriptions, illustrations, and processes of FIG. 4 are merely exemplary and the process 400 may use other descriptions, illustrations, and processes for using an input device that includes a haptic device (e.g., haptic device/coil 216) and an NFC device (e.g., the NFC device/antenna 214).

In operation, at block 402, the processing system 205 receives, using an input device (e.g., input device 200) comprising a PCB assembly (e.g., PCB assembly 211) with a haptic device (e.g., haptic device 216) and an NFC device (e.g., NFC device 214), user input. The NFC device and the haptic device are on a same PCB of the PCB assembly.

At block 404, the processing system 205 coordinates providing haptic feedback to a user using the haptic device and communicating NFC signals using the NFC device. FIGS. 5A and 5B describe block 404 in more detail. Referring to FIG. 5A, at block 502, the processing system 205 drives the haptic device to provide the haptic feedback to the user at a first time. At block 504, the processing system 205 drives the NFC device to communicate the NFC signals at a second time that is different from the first time to avoid electrical interference between the haptic device and the NFC device of the input device.

Referring to FIG. 5B, at block 512, the processing system 205 determines that the NFC device of the input device is communicating with or is to communicate with a separate device. At block 512, in response to the determination, the processing system 205 modifies a haptics signal of the haptic device during the time period of the communications to avoid electrical interference between the haptic device and the NFC device of the input device. The modification may include, for example, removing or minimizing the use of certain frequencies in the haptics signal.

In an alternative example, the haptic device may be configured to utilize a haptics signal which minimally interferes with frequencies used by the NFC device at all times, such that the determination and modification steps of FIG. 5B are not needed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the application (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

The invention claimed is:

1. An input device, comprising:
a printed circuit board (PCB) assembly comprising:
touch sensors configured to detect a user input from a user;
a haptic coil configured to provide haptic feedback to the user in response to detecting the user input; and
a near-field communication (NFC) antenna configured to facilitate NFC communications;
wherein the PCB assembly comprises a single PCB, wherein the single PCB comprises a plurality of layers, and wherein the touch sensors, the haptic coil, and the NFC antenna are positioned on one or more layers of the plurality of layers of the single PCB.

2. The input device of claim 1, further comprising:
a processing system configured to coordinate providing the haptic feedback to the user using the haptic coil and communicating NFC signals using the NFC antenna.

3. The input device of claim 2, wherein the processing system is configured to coordinate providing the haptic feedback and communicating the NFC signals by:
driving the haptic coil to provide the haptic feedback to the user at a first time; and
driving the NFC antenna to communicate the NFC signals at a second time that is different from the first time to avoid electrical interference between the haptic coil and the NFC antenna.

4. The input device of claim 2, wherein the processing system is configured to coordinate providing the haptic feedback and communicating the NFC signals by:
determining that the NFC antenna is communicating with or is to communicate with a separate device; and
in response to the determination, modifying a haptic signal of the haptic coil during a time period of the communications to avoid electrical interference between the haptic coil and the NFC antenna.

5. The input device of claim 4, wherein the processing system is configured to modify the haptic signal by:
reducing a strength of one or more frequencies used by the haptic coil to provide the haptic feedback.

6. The input device of claim 1, further comprising:
a processing system configured to determine a sensing frequency for the touch sensors to avoid interference caused by the haptic coil and/or the NFC antenna, wherein the touch sensors are configured to detect the user input based on the sensing frequency.

7. The input device of claim 6, wherein the processing system is further configured to:
generate, based on the sensing frequency, a touch signal for detecting the user input; and
modify filtering of the touch signal based on the haptic coil providing the haptic feedback or using the NFC antenna for the NFC communications.

8. The input device of claim 1, further comprising: a processing system configured to:
select a first frequency as a sensing frequency for the touch sensors;
select a second frequency for the haptic coil; and
select a third frequency for the NFC antenna.

9. A method, comprising:
detecting, using touch sensors of an input device, user input from a user, wherein the input device comprises a printed circuit board (PCB) assembly, wherein the PCB assembly comprises the touch sensors, a haptic coil, and a near-field communication (NFC) antennas wherein the PCB assembly comprises a single PCB, wherein the single PCB comprises a plurality of layers, and wherein the touch sensors, the haptic coil, and the NFC antenna are positioned on one or more layers of the plurality of layers of the single PCB;
providing, using the haptic coil of the input device, haptic feedback to the user in response to detecting the user input; and
facilitating NFC communications using the NFC antenna of the input device.

10. The method of claim 9, wherein providing the haptic feedback to the user using the haptic coil and communicating the NFC signals using the NFC antenna is coordinated by a processing system of the input device.

11. The method of claim 10, wherein coordination of providing the haptic feedback to the user and communicating the NFC signals comprises:
driving the haptic coil to provide the haptic feedback to the user at a first time; and
driving the NFC antenna to communicate the NFC signals at a second time that is different from the first time to avoid electrical interference between the haptic coil and the NFC antenna.

12. The method of claim 10, wherein coordination of providing the haptic feedback to the user and communicating the NFC signals comprises:
determining that the NFC antenna is communicating with or is to communicate with a separate device; and
in response to the determination, modifying a haptic signal of the haptic coil during a time period of the communications to avoid electrical interference between the haptic coil and the NFC antenna.

13. The method of claim 12, wherein modifying the haptic signal comprises reducing a strength of one or more frequencies used by the haptic coil to provide the haptic feedback.

14. The method of claim 9, further comprising:
determining, by a processing system of the input device, a sensing frequency for the touch sensors to avoid interference caused by the haptic coil and/or the NFC antenna, wherein the touch sensors are configured to detect the user input based on the sensing frequency.

15. The method of claim 9, further comprising:
selecting a first frequency as a sensing frequency for the touch sensors;
selecting a second frequency for the haptic coil; and
selecting a third frequency for the NFC antenna.

16. A printed circuit board (PCB) assembly, comprising:
touch sensors configured to detect a user input from a user;
a haptic coil configured to provide haptic feedback to the user in response to detecting the user input; and a near-field communication (NFC) antenna configured to facilitate NFC communications;
wherein the PCB assembly comprises a first PCB and a second PCB, wherein the touch sensors are positioned on the first PCB, and wherein the NFC antenna and the haptic coil are positioned on the second PCB.

* * * * *